United States Patent
Brooks

[11] Patent Number: 5,546,735
[45] Date of Patent: Aug. 20, 1996

[54] HORSE HOOF SANDAL

[76] Inventor: Carleton Brooks, 100 Central Ave., Redwood City, Calif. 94061

[21] Appl. No.: 276,904

[22] Filed: Jul. 19, 1994

[51] Int. Cl.[6] ....................................................... B68C 5/00
[52] U.S. Cl. ................................................. 54/82; 168/27
[58] Field of Search ................................... 168/2, 18, 22, 168/27; 54/82; 606/212

[56] References Cited

U.S. PATENT DOCUMENTS

| | | | |
|---|---|---|---|
| 167,895 | 9/1875 | Hall | 168/2 |
| 414,752 | 11/1889 | Chapman | 54/82 X |
| 424,573 | 4/1890 | Philo | 168/2 |
| 626,313 | 6/1899 | Stuart | 168/27 |
| 1,825,186 | 9/1931 | Harsem . | |
| 2,041,538 | 5/1936 | Gash et al. . | |
| 2,056,373 | 10/1936 | Steinmetz . | |
| 3,682,179 | 8/1972 | Firth et al. | 54/82 X |
| 3,703,209 | 11/1972 | Glass | 168/18 |
| 3,967,683 | 7/1976 | Ensinozo | 168/4 |
| 4,155,406 | 5/1979 | Hourlier | 168/18 |
| 4,189,004 | 2/1980 | Glass | 168/4 |
| 4,346,762 | 8/1982 | Tivom | 168/4 |
| 4,384,150 | 5/1983 | Lyakhevich et al. | 585/241 |
| 4,686,007 | 8/1987 | Lyakhevich et al. | 201/3 |
| 4,935,018 | 6/1990 | Scholz | 606/212 X |
| 4,982,797 | 11/1991 | Monticello | 168/4 |
| 5,199,468 | 4/1993 | Knudsen | 168/28 |

FOREIGN PATENT DOCUMENTS

| | | | |
|---|---|---|---|
| WO88/00793 | 2/1988 | Germany . | |
| 1093337 | 5/1984 | Russian Federation | 54/82 |

*Primary Examiner*—Robert P. Swiatek
*Attorney, Agent, or Firm*—Dergosits & Noah

[57] ABSTRACT

A horse hoof sandal which has a substantially triangular pad dimensioned and configured to occupy at least a portion of the area adjoining the frog of a horse hoof. The pad is kept against the frog by one or more support bands which are directly attached to the substantially triangular pad. A hoof growth promoting substance may be applied to promote hoof growth and attendant healing of damaged hooves. A hoof growth promoter is also provided having an elastic band and a hoof growth promoting substance which is applied to the coronet of a horse's leg.

10 Claims, 4 Drawing Sheets

HORSE HOOF SANDAL

BACKGROUND OF THE INVENTION

1. Field of the Invention

The present invention relates to protection of horse hooves from damage incurred during normal or heavy use. More particularly, the present invention relates to hoofwear which prevents continuing damage to horse hooves, allows or facilitates natural repair of damaged hooves, and increases circulation in the hoof and leg area.

2. Description of Related Art

A horse hoof is a curved covering of horn that encloses the ends of the digits of horses and corresponds to a nail or claw of other animals. The hoof is made of a horny wall having a toe at the front, side walls at the sides, and quarters and buttresses toward the rear. The rearmost portion of the hoof has two opposing areas called the bulbs which abut the buttresses. Two opposing extensions of the buttresses called bars project toward the center of the sole of the hoof and are located adjacent the frog. The frog is a triangular shaped elastic horny pad having a base which is attached to the sole by a layer known as the white line. The horny wall protects the relatively soft sole and frog by growing and extending down past the sole and frog such that the wall contacts the surface on which the horse moves and bears most of the impact of a horse's step. The horny wall grows in much the same way as a human finger or toe nail, i.e., it grows lengthwise and toward the end of the digit. The horny wall grows downwardly from an area above the hoof called the coronet. The coronet is located at the lower part of a horse's pastern where the horn terminates in skin.

When the horse walks, trots or gallops on a barefoot hoof, the frog and bar help to distribute and moderate the shock of impacting the ground. When the horse walks, the sidewalls contract and expand on contact with the ground. The temporary change in shape causes the frog to help circulate blood in the horses hoof and leg. Horses typically carry approximately 60% of their weight (which can be 1,100 pounds) on their front legs. Ideally, a horse would land squarely on its hooves as it moves. However, most horses do not ordinarily land squarely on their hooves which can result in uneven wearing and ultimately in problems such as lameness. This effect is magnified on hard surfaces such as cement and the like. The most common problems tend to develop in the area of the frog. When stressed, the frog compresses, grows unevenly, and can even grow in on itself in much the same manner as an ingrown toenail. Moreover, the horn can deteriorate, crack and press on sensitive parts of the hoof, thus causing significant pain. Cracking of the horn is even more of a problem in arid climates because hooves normally absorb moisture from the ground where they step. Dew and rain are absorbed which keeps the frog, sole, and horn supple and growing. Lack of moisture contributes to brittleness of the horn and increases the possibility of hoof damage.

As a result of these well recognized problems, numerous attempts have been made to alleviate uneven wear and protect the hoof. A well known solution is the metal horseshoe which is nailed onto the hoof. Unfortunately the metal horseshoe is far from an ideal solution. The metal horseshoe keeps the sole and frog from contacting the ground, but does not permit fluctuation of the horn and stimulation of the frog. Consequently, circulation is not augmented by pumping in the hoof which may lead to problems in normal growth and repair. Since the shoes are nailed on with nails that forcibly pierce the horn, cracking or breaking of the horn may result. Moreover, all the stress of walking or galloping is concentrated on the horn directly above the shoe instead of being distributed to the frog and the rest of the sole.

Certain attempts to protect horse hooves have focused on protecting and/or stimulating the frog. One commercially available product is called the Lily-Pad™, available from Therapeutic Equine (Indianapolis, Ind.). The Lily-Pad™ is a one piece unit made from high density molded rubber which is placed over the frog, bulbs and heel of the hoof and up to the pastern. It is attached with self-adhering tape. The Lily-Pad™ is illustrated in FIG. 1. Unfortunately, the Lily-Pad™ is not free from problems. The use of tape to attach or mount the Lily-Pad™ is time consuming and expensive and, because the tape contacts the ground, it wears away and must frequently be replaced. In order to insure proper stability of the Lily-Pad™, the tape must be applied high up on the pastern which may cause damage to the bone. Most importantly, the Lily-Pad™ invariably moves away from its preferred position and around the sole of the hoof as the horse walks despite the prescribed taping. The Lily-Pad™ then actually creates excessive pressure in areas it was not designed to abut causing further discomfort and/or damage to the hoof.

A horseshoe for trotting horses is described in PCT Pub. No. WO 88/00793 and includes a thin plate member of resiliently bendable plastic on which there are two thickened areas, i.e., an outer arched area along the front half of the shoe and a rear triangular area. The arched area is held nailed into the rim of the hoof and the triangular area covers the frog. The triangular area is said to be able to effect blood pumping relative movements. Unfortunately, the same problems associated with nailing this horseshoe into the hoof exist as with a conventional metal horseshoe. Moreover, the horn rests on the disc which then presses up against the bulbs, heel and collateral cartridge areas, creating pressure at the precise points that it is supposed to be designed to alleviate.

Consequently, there is a clear need for horse hoofwear that is effective in preventing uneven hoof wearing, promoting circulation, easy to use, efficient and relatively inexpensive. The present invention is directed to such a solution.

SUMMARY OF THE INVENTION

The present invention provides a horse hoof sandal having a substantially triangular member dimensioned and configured to occupy at least a portion of the area adjoining the frog of a horse hoof, the substantially triangular member having at least a first band attached thereto which is dimensioned and configured to support the substantially triangular member under and against the frog of the hoof. The horse hoof sandal may have a second band which cooperates with the first band to help support the substantially triangular member against the frog of the hoof. The first band may extend from the area near the apex of the substantially triangular member and surround the foreword face of the hoof while the second band may extend from an area near the base of the substantially triangular member and surround the coronet of the horse hoof. The bands may be elastic and/or manually adjustable in length.

In one aspect, a hoof growth promoting substance is contacted with the coronet, under the second band and thus facilitates hoof growth and repair while the sandal is worn by the horse. Alternatively, the hoof growth promoting substance is applied to the second band which is then made to contact the coronet.

In another aspect, a method of preventing damage to a horse hoof involves using the above-mentioned horse hoof sandal by attaching it to a horse hoof and allowing the sandal to protect the hoof.

In yet another aspect, a horse hoof growth promoting device includes a band which is dimensioned and configured to contact at least a portion of the coronet of a horse hoof. The band is made to incorporate or to contact a hoof growth promoting substance which causes or facilitates hoof growth. A method of using the horse hoof growth promoting device is provided.

DETAILED DESCRIPTION OF THE INVENTION

A horse hoof sandal in accordance with the present invention protects horses' hooves from uneven wear and deterioration, increases circulation and allows worn or injured hooves to heal themselves. The inventive horse hoof sandal is easy to install and maintains proper alignment during normal or strenuous use without the need for unwieldy taping or damaging nailing of the sandal into the hoof. In one aspect of the present invention, use of the sandal actually increases horn production, thus promoting the healing process of an injured hoof.

Figure 1:
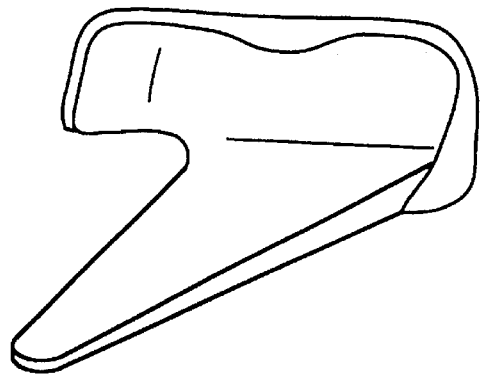
FIG. 1 illustrates a prior art horse frog pad.
Figure 2:
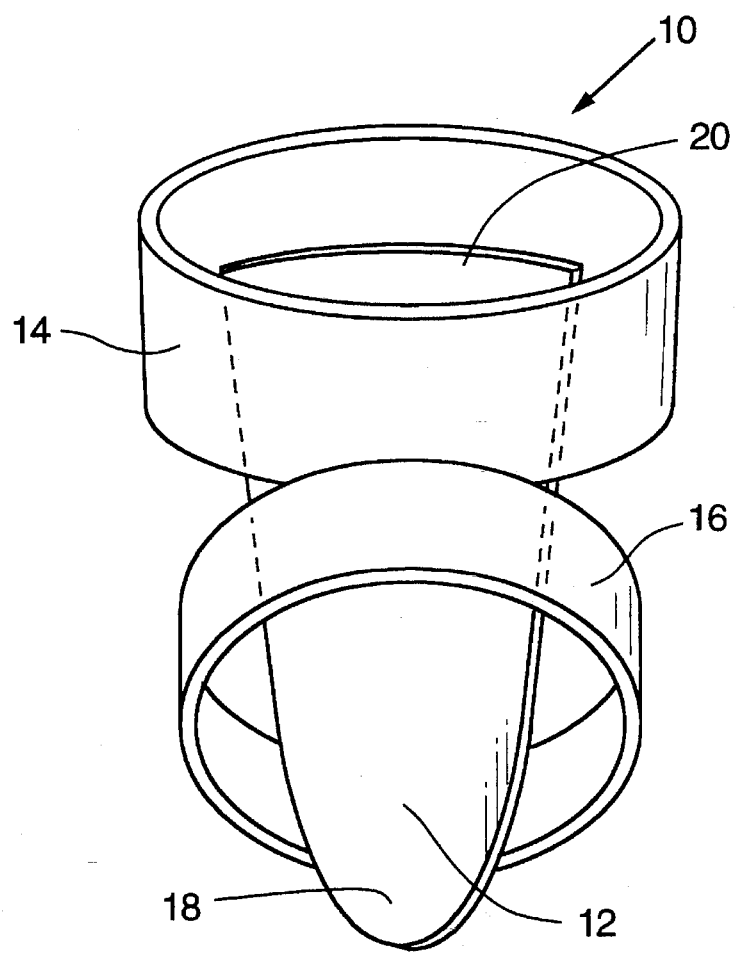
FIG. 2 illustrates a perspective top view of a horse hoof sandal according to the present invention.
Figure 3:
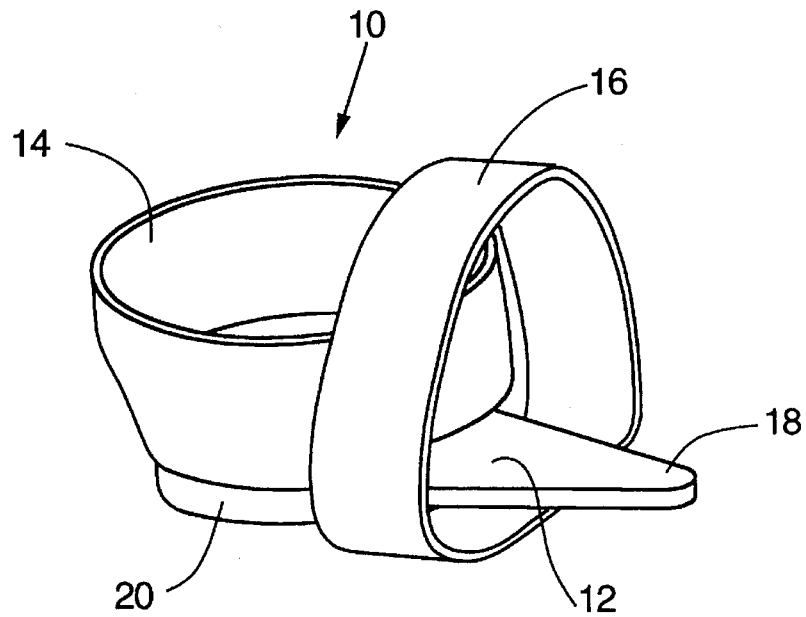
FIG. 3 illustrates a perspective side view of the horse hoof sandal shown in FIG. 2.

In one aspect, a horse hoof sandal 10, illustrated in FIG. 2, provides a substantially triangular shaped pad 12 which is held in place under and against the frog of a horse hoof by straps or bands, e.g., coronet band 14 and apex band 16. The pad 12 has an apex portion 18 and a base portion 20. The base portion, as defined herein, extends anywhere from about the middle of the pad 12 to the distal edge at the base of the triangle formed by the pad 12. The apex portion 18 as defined herein, extends anywhere from about the middle of the pad 12 (excluding but contiguous with the base portion 20) to the point of the apex of the triangle formed by the pad 12. The coronet band 14 is attached to the base portion 20 (see FIGS. 3 and 6) and is positioned such that the axis of the coronet band 14 is approximately perpendicular to the plane of the pad 12.

The apex band 16 is attached at the apex portion 18 (see FIGS. 3 and 6) and positioned such that the axis of the apex band 16 is approximately parallel with the plane of the pad 12. By use of the terms "approximately perpendicular" and "approximately parallel" it is contemplated that a fairly wide variation of angles is suitable, i.e., at least plus or minus thirty degrees.

In one embodiment, the coronet band 14 and the apex band 16 are each separately formed as fully circular or fully elliptical continuous bands and are attached to the underside of the pad 12 by known techniques. For example, the bands can be adhered to the underside of the pad 12 by heat lamination, glue, or by mechanical techniques such as by rivets and the like. Any combination of bonding techniques known to those with skill in the art are suitable. Alternatively, the bands may be split open and the ends attached to the sides of the pad 12 in appropriate locations. The bands may range from about ½ inch to about 5½ inches wide, but are preferably about 1 inch to about 2¼ inches wide.

In another embodiment, the entire hoof sandal may be of unitary construction and made, for example, by injection molding, or by carving or stamping the hoof sandal shape from a stencil form. A horse hoof sandal in accordance with the present invention may be fabricated from a wide range of materials such as leather or polymers, e.g., polyvinyl chloride, polyethylene terephthalate, polycarbonate, vulcanized rubber, gum rubber, polyolefin, polyurethane, polylactone, etc. The properties of commonly used polymers are well-known and are adaptable for use in forming any aspect or embodiment of the presently disclosed horse hoof sandal. The pad 12 can be made rigid using, e.g., polyvinyl chloride or polyethylene terephthalate or can be made soft and resilient with, e.g., a urethane foam or gum rubber to absorb shocks. The pad 12 can be made of multiple layers of materials which have different physical and chemical properties, e.g., a tough bottom layer designed to endure impacts, rubbing and heavy wear and a shock absorbing top resilient layer for contacting and cushioning the frog.

The bands may be made of elastic and/or resilient material having a relatively high coefficient of friction. Suitable materials include gum rubber, vulcanized rubber, urethane, polyvinyl and the like. When the coronet band 14 or apex band 16 are fabricated from such materials, they adhere tenaciously to the hoof and prevent the bands from moving or shifting position. In this way, the pad 12 is kept securely in the proper orientation relative to the frog and undesirable migration of the pad is avoided. Additionally, the snug fit created by such elasticity creates friction heat under the coronet band 14 as the horse walks and heat promotes growth of the horn. Consequently, reconstruction and healing of a damaged hoof is encouraged by the horse hoof sandal.

In another aspect of the present invention, a hoof growth promoting substance is contacted with a horse's coronet by either rubbing it onto the coronet or by applying hoof growth promoting substance onto the coronet band 14 and then fitting the coronet band 14 around at least a portion of the coronet. If the coronet band 14 is porous, hoof growth promoting substance may also be impregnated into the coronet band for sustained release to the coronet.

Hoof growth promoting substances which may be used in accordance with the present invention are water and polyols such as glycerin and propylene glycol. Other known polyols which are relatively non-toxic and possess humectant properties are suitable as hoof growth promoting substances. Such hoof growth promoting substances facilitate creation of heat but also act as a lubricant to minimize damage to the coronet which may be caused by friction.

The substantially triangular pad 12 is shaped to conform to the frog of a hoof and to rest comfortably against it when the sandal is placed onto the hoof. By "substantially triangular" it is meant that the pad may approximate a triangle shape. Thus, the corners of the triangle may be truncated or beveled and the sides of the pad may be irregular. In this way, it is contemplated that the pad be generally contoured to fit onto a portion or all of the frog. In one embodiment, the apex portion, i.e., the portion which corresponds to the portion of the frog opposite the heel, may be truncated into a frustotriangular shape. The frustotriangular shape can prevent irritation of the frog in certain instances. The pad 12 may be flat or, in an alternative embodiment, the pad 12 may gradually become thicker between the apex portion 18 and the distal edge of the base portion 20. Custom applications, i.e., fitting the substantially triangular pad to the contour or shape of individual frogs are also contemplated by the present invention.

Figure 4:
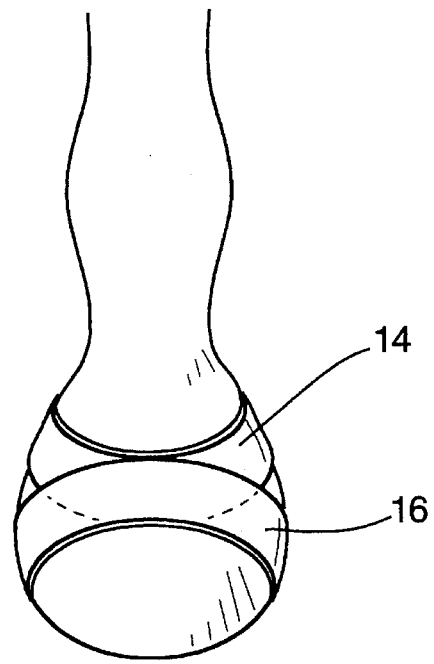
FIG. 4 illustrates a front view of a band configuration assumed by the horse hoof sandal shown in FIGS. 2 and 3 mounted on a horse hoof.
Figure 5:
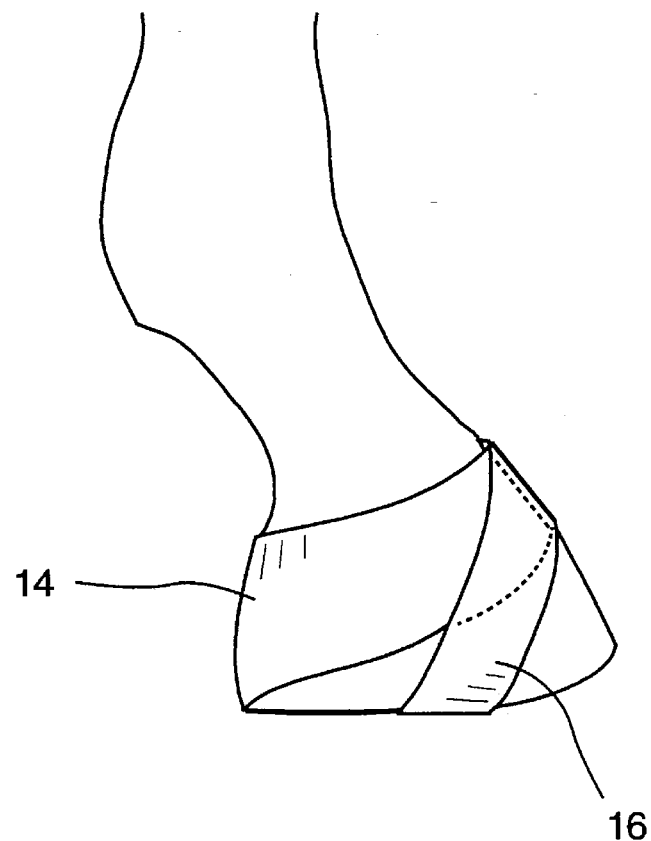
FIG. 5 illustrates a side view of a strap configuration assumed by the horse hoof sandal shown in FIGS. 2 and 3 mounted on a horse hoof.
Figure 6:
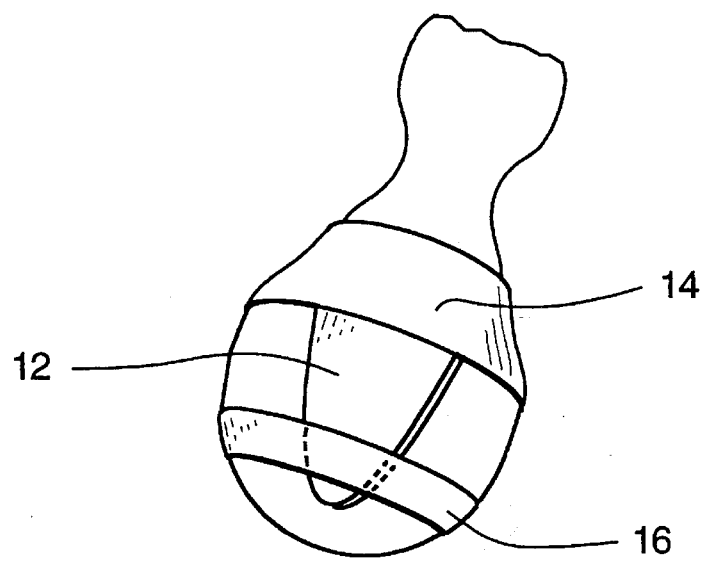
FIG. 6 illustrates a perspective bottom view of the horse hoof sandal shown in FIGS. 2 and 3 mounted on a horse hoof.

In use, the horse hoof sandal 10 is applied to a hoof by placing the substantially triangular pad against the frog and slipping the coronet band 14 around the coronet but below the pastern. The apex band 16 is then slipped over and around the front of the hoof and the horse hoof sandal 10 is positioned as shown in FIGS. 4,5 and 6.

Figure 7:
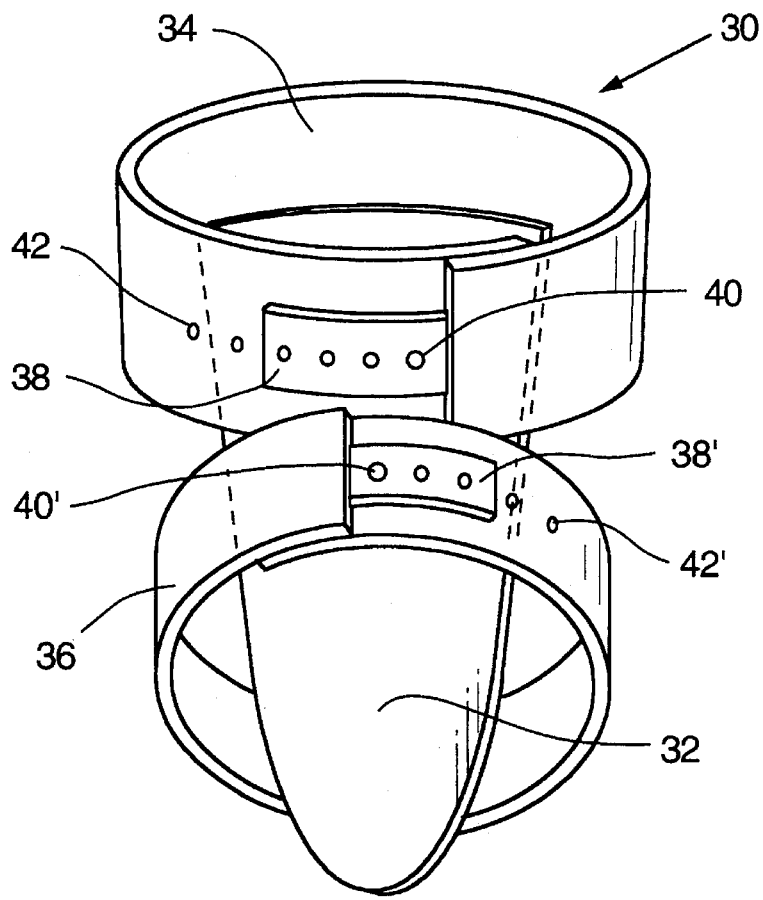
FIG. 7 illustrates a perspective top view of another embodiment of a horse hoof sandal according to the present invention.

In another aspect of the present invention shown in FIG. 7, the bands of the horse hoof sandal 30 are adjustable in length. Adjustable bands may be useful when the person putting the sandal on the hoof has trouble mustering up the force needed to properly stretch the elastic bands and place them where appropriate on the hoof and/or coronet.

The horse hoof sandal 30 has a substantially triangular shaped pad 32 which is held in place under and against the frog of a hoof by adjustable straps or bands, e.g., adjustable coronet band 34 and adjustable apex band 36. In a manner similar to that described above, the adjustable coronet band is attached at the base portion of the pad 32 and the adjustable apex band is attached at the apex portion of the pad 32. The bands are closed using an adjustable button strap closure. The button strap closure has catches 38 and 38', respectively, which contain holes 40 and 40' which mate with protuberances 42 and 42' to prevent the bands from opening.

While a button strap closure is exemplified herein, it is contemplated that any device which provides adjustability to belts, straps and bands may be used in accordance with the present invention. Thus, those with skill in the art may adapt buckles, hook and loop type fasteners such as VELCRO® and any other adjustable closure device to the bands of the present invention.

Figure 8:
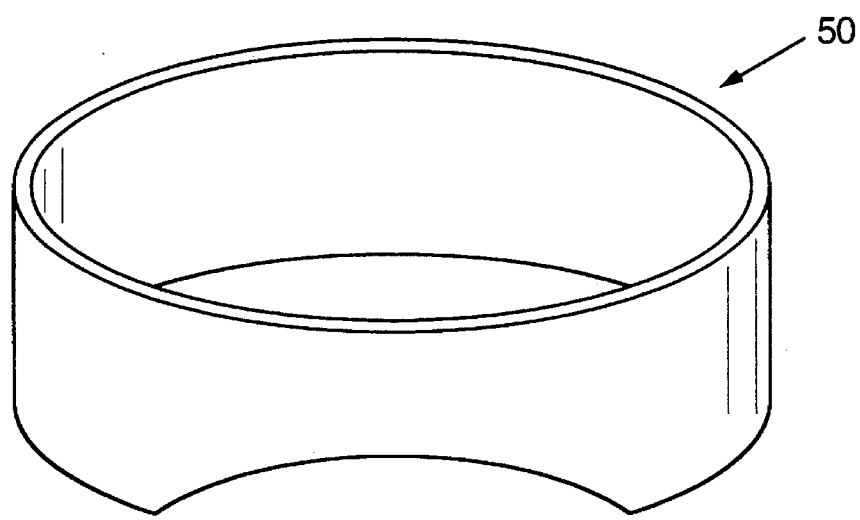
FIG. 8 illustrates a perspective view of a hoof growth promoter according to the present invention.

In another aspect of the present invention, a hoof growth promoter 50, shown in FIG. 8, is a band of elastic and resilient material made from, e.g., a polymeric composition such as gum rubber, vulcanized rubber, urethane or any other polymeric material having good elasticity and resiliency, which is placed around the coronet of a horse's leg. The band may range from approximately ½, to approximately 5½, inches wide, but is preferably between about 2¼ and 2½, inches wide and should fit snugly on the coronet. As above, a hoof growth promoting substance is applied to the coronet, applied to the band, and/or impregnated into the band itself. The band is then placed around the coronet and allowed to cause heat at the coronet. As a consequence, horn growth is stimulated by the hoof growth promoter. In the case of horses with hoof damage, or damage to the soft tissues within the hoof, correct growth of the horn is considered to be the best solution to resulting lameness. The elastic and resilient band supports the heel without deleterious pressure. The hoof growth promoter also serves to protect the heel of the hoof during work or normal movement by cushioning the area.

The above disclosure and examples should not be considered as limitations to the express aspects and embodiments disclosed, but rather as exemplars of the invention. Consequently, modifications may be made by those with skill in the art that are within the scope of the following claims.

What is claimed is:

1. A horse hoof sandal comprising a substantially triangular member dimensioned and configured to occupy at least a portion of the area adjoining the frog of a hoot, the substantially triangular member having at least a first band and a second band attached thereto, the first band dimensioned and configured to support the substantially triangular member under and against the frog of the hoof, the second band dimensioned and configured to support the substantially triangular member against the frog of the hoof.

2. A horse hoof sandal according to claim 1 wherein the first band is attached at the apex portion of the substantially triangular member and the second band is attached at the base portion of the substantially triangular member.

3. A horse hoof sandal according to claim 2 wherein the first band is dimensioned and configured to extend from the apex portion of the substantially triangular member and around the front portion of the hoof, and the second band is dimensioned and configured to extend from the base portion of the substantially triangular member and around at least a portion of the coronet of the hoof.

4. A horse hoof sandal according to claim 1 wherein at least the first band comprises an elastic material.

5. A horse hoof sandal according to claim 1 wherein at least the first band is adjustable in length.

6. A horse hoof sandal according to claim 1 wherein the substantially triangular member is substantially frustotriangular.

7. A horse hoof sandal according to claim 1 wherein a hoof growth promoting substance is contacted with the second band.

8. A horse hoof sandal according to claim 7 wherein the hoof growth promoting substance is selected from the group consisting of polyols and water.

9. A method of preventing damage to a horse hoof comprising attaching a horse hoof sandal to a horse hoot; the horse hoof sandal having a substantially triangular member dimensioned and configured to occupy a least a portion of the area adjoining the frog of the hoof, the substantially triangular member having at least a first band and a second band attached thereto, the first band dimensioned and configured to support the substantially triangular member against at least a portion of the frog of the hoof, the second band dimensioned and configured to support the substantially triangular member against the frog of the hoof.

10. A method according to claim 9 further comprising stimulating hoof growth of a horse hoof by contacting at least one of said bands with a hoof growth promoting substance selected from the group consisting of polyols and water and contacting the band and growth promoting substance with at least a portion of the coronet of the horse.

\* \* \* \* \*